United States Patent Office … 3,574,154 Patented Apr. 6, 1971

3,574,154
CELLULOSE ACETATE BUTYRATE COATING COMPOSITIONS AND COATED PRODUCTS
Robert S. Shaw, Huntingdon Valley, Bayard V. Tirrill, Warminster, and John L. Gardon, Cheltenham, Pa., assignors to Rohm and Haas Company, Philadelphia, Pa.
No Drawing. Filed July 11, 1968, Ser. No. 743,968
Int. Cl. C08b 21/08; C08g 41/00; C08h 15/00; C09d 3/48
U.S. Cl. 260—16                5 Claims

ABSTRACT OF THE DISCLOSURE

The present invention is concerned with improved coating compositions based on cellulose acetate butyrate plasticized with diisocyanate-extended polyesters having a molecular weight of at least 8000. The invention also includes flexible products, such as substitute leather having topcoatings thereon of outstanding flexibility made from these compositions.

---

Coating compositions of plasticized cellulose acetate butyrate have been used for many purposes but those heretofore used have been found insufficiently flexible (apparently lacking sufficient elastic recovery) when used to coat flexible substrates having thicknesses of one to four millimeters or greater. For instance, when applied to leather or leather substitutes of this order of thickness, whether as a base coat or a topcoat, and the coated article is sharply creased at a 180° angle with the coated side out, and then restored to flat condition, a distinct crease develops along the line of bend, and this is particularly pronounced when the cellulose acetate butyrate coating is a nonpigmented topcoat over a dark-colored subcoat or subcoats, being in that case manifest as a dull or white streak which may have a width of about one to three millimeters or even more.

In accordance with the present invention, coating compositions comprising, dissolved in a suitable organic solvent or mixture thereof, (1) a cellulose acetate butyrate of a certain composition and molecular weight and (2) a plasticizer for the cellulose ester formed of a diisocyanate-modified polyester having a molecular weight of about 8000 to 20,000, preferably 10,000 to 15,000, have been found to overcome the flexing difficulties mentioned hereinabove and to be capable of providing protective coats, particularly against wear and weather, fully as well as the known prior compositions of cellulose acetate butyrate type. The compositions of the present invention are characterized also by improved flow and provide coatings having outstanding elastic recovery so that relatively thick substrates provided with a coat of the composition of the present invention can be creased sharply with the coating being bent into either convex or concave disposition, without developing streaks along the line of bend.

More specifically, the coating composition of the present invention comprises an inert volatile organic solvent, a ½ to 5-second viscosity cellulose acetate butyrate containing 20 to 30% butyrate and 26 to 18% acetate and, for each 100 parts by weight of the cellulose acetate butyrate, from 35 to 70 parts of a plasticizer comprising from 0 to 30 parts by weight of a linear polyester of a diol having 2 to 8 carbon atoms and a dicarboxylic acid having from 4 to 12 carbon atoms, the polyester having a hydroxyl number from 10 to 50, an acid number of 10 or less, and a molecular weight of 4,000 to 8,000 and from 35 to 70 parts by weight of a condensation product having a molecular weight of at least 8,000 up to 20,000 of (1) an organic diisocyanate and (2) a linear polyester having a composition as just defined except that it has an acid number which is not over 5 and a molecular weight anywhere in the range of 2,000 to 7,500.

The cellulose acetate butyrate must have 20 to 30% of the hydroxyl groups in a glucose unit esterified with butyric acid and from 26 to 18% of such hydroxyl groups esterified by acetic acid. In the following description and in the claims this is referred to as a cellulose acetate butyrate containing 20 to 30% butyrate and 26 to 18% acetate. Preferably, this ester contains 24 to 28% butyrate and 19 to 22% acetate. The molecular weight of the cellulose ester must be such that when viscosity is determined on a 20% solution in a 90:10 acetone/ethanol mixture at 25° C. on a falling ball viscometer (ASTM D–1343–54T), the viscosity will be in the range of from ½ to 5 seconds and preferably from ½ to 3 seconds, using a $5/16$-inch steel ball falling through 10 inches in a 1-inch tube. This specification of molecular size of the cellulose acetate butyrate is commonly used in the industry and simply identifies the cellulose acetate butyrate as having a ½-second, a 5-second or intermediate viscosity. If the butyrate content is above 30%, it has been found that the compositions obtained that would otherwise be within the scope of the invention are too tacky for certain uses. Thus, in coated articles which must be embossed by the application of heat and pressure after coating, the composition obtained with cellulose acetate butyrate having more than 30% butyrate content would exhibit poor plate release after embossing. On the other hand, when the butyrate content is below 20%, the coating has insufficient elasticity and fails to overcome the difficulty mentioned hereinabove when the coating is applied to thick, flexible substrates and then sharply creased.

One component of the plasticizer employed in accordance with the present invention may be a simple linear polyester having a molecular weight of 4,000 to 8,000 obtained from a diol having from 2 to 8 carbon atoms and a dicarboxylic acid having from 4 to 12 carbons. Examples of the diols that can be used include ethylene glycol, diethylene glycol, propylene glycol, dipropylene glycol, 1,4-butylene glycol, 1,5-pentanediol, trimethylene glycol, 1,3-butylene glycol, 1,2-butylene glycol, 1,4-pentanediol, 1,6-hexamethylenediol, and 2-ethyl-1,3-butanediol. Many of the glycols are obtainable from olefins through oxidation reactions. Mixtures of glycols are useful, as well as simply glycols.

Typical dicarboxylic acids which are suitable include the following: sebacic, azelaic, suberic, pimelic, adipic, glutaric, succinic, isosebacic, dimethyl adipic, malonic, phthalic, isophthalic terephthalic, 3-methyl phthalic, 4-methyl phthalic, 3,4-dimethyl phthalic, and the like. These may be used individually or in mixtures.

In the preparation of such linear polyesters the diol is used in small excess of the stoichiometric equivalent amount relative to the dicarboxylic acid. The diol and diacid may be reacted in conventional manner by heating at a temperature of 50° C. up to just below the temperature of the boiling point of the diol. An esterification catalyst such as zinc acetate, zinc oxide, and stannous oxide may be employed. The reaction is carried out until the hydroxyl number of the polyester is in the range of about 10 to 50 and the acid number is not over 10 but preferably below 5 such as from about 1 to 4.5. Molecular weights of a linear polyester obtained by this reaction may be from 2,000 to 8,000; however, when it is desired to use the polyester as one component of the plasticizer of the cellulose acetate butyrate in the compositions of the present invention, the polyester should have a molecular weight of at least 4,000.

Another component of the plasticizer, which may be the entire component, is a linear polyester having a hydroxyl number in the range of 10 to 50, an acid number not over 5 and a molecular weight of 2,000 to 7,500 extended by reaction with a diisocyanate until the molecular weight of the condensation product obtained is in the range of at least 8,000 up to 20,000. The resulting product may be termed a "diisocyanate-extended linear polyester" or it may be called a "linear polyester modified by reaction with a diisocyanate."

Examples of diisocyanates that may be employed include one of, or a mixture of, the following: ethylene diisocyanate, trimethylene diisocyanate, tetramethylene diisocyanate, pentamethylene diisocyanate, propylene-1,2-diisocyanate, butylene-1,2-diisocyanate, butylene-1,3-diisocyanate, butylene-2,3-diisocyanate, and hexamethylene diisocyanate; alkylidine diisocyanates, such as ethylidene diisocyanate ($CH_3CH(NCO)_2$) and butylidene diisocyanate $CH_3CH_2CH_2CH(NCO)_2$; cycloalkylene diisocyanates such as cyclopentylene-1,2-diisocyanate, cyclohexylene-1,2-diisocyanate, and cyclohexylene-1,4-diisocyanate; aromatic diisocyanates such as m-phenylene diisocyanate, p-phenylene diisocyanate, 1-methylphenylene-2,4-diisocyanate, naphthalene-1,4-diisocyanate, o,o'-toluenediisocyanate, xylylene-1,4-diisocyanate, xylylene-1,3-diisocyanate, 4,4'-diphenylmethane diisocyanate, and 4,4'-diphenylenepropane diisocyanate, p-phenylenediisocyanate, o-phenylenediisocyanate, methylene-bis(4-phenylisocyanate), 1-chloro-2,4-phenylenediisocyanate, diphenyl - 3,3' - dimethyl-4,4-diisocyanate, diphenyl-1,3'-dimethoxy-4,4'-diisocyanate, 1,3-phenylenediisocyanate, p-dixylyl methane-4,4'-diisocyanate. The proportion of polyisocyanate employed is sufficient to react with the hydroxyl groups of the linear polyester.

The diisocyanate-extended polyester may be prepared by reacting the diisocyanate with a solution of the linear polyester in an inert organic solvent such as xylene, benzene, toluene, solvent naphthas, or mineral spirits. The temperature of reaction may vary from room temperature up to 100° C. or higher. If desired, a catalyst such as a tertiary amine may be employed or tin catalyst such as stannous octoate are preferred.

The relative amounts of diisocyanate and linear polyester are selected to assure that the condensation product has a molecular weight in the range of 8,000 to 20,000. Thus, depending on the molecular weight of the linear polyester starting material more or less of the diisocyanate may be used.

In compositions in accordance with the invention wherein the extended polyester is used as the sole plasticizer, it is used in an amount of 35 to 70 parts by weight per hundred parts by weight of cellulose acetate butyrate. A portion of the plasticizer may be constituted of the simple linear polyester (unextended by diisocyanate) and when that is the case, there may be up to 30 parts of the maximum 70 parts of plasticizer replaced with the simple polyester. Thus, the compositions may contain, per hundred parts of cellulose acetate butyrate, from 0 to 30 parts by weight of the simple linear polyester of molecular weight from 4,000 to 8,000 and from 35 to 70 parts by weight of the diisocyanate-extended polyester having a molecular weight from 8,000 to 20,000. In all cases, however, the total amount of plasticizer whether it consists entirely of the extended polyester or is a mixture of the simple polyester with the extended polyester should not exceed 70 parts by weight per hundred parts of cellulose acetate butyrate.

The cellulose acetate butyrate and the plasticizer or plasticizers are dissolved in a suitable inert solvent to provide a concentration suitable for coating purposes which may vary from 1% to 30% or more depending on the particular substrate to which the composition is to be applied and the manner in which it is to be applied.

Application of the coating composition may be by spraying, brushing, transfer rolls, dipping or any other conventional coating equipment. One or more coats may be applied as desired. The thickness of the coating may vary depending upon the particular purposes that it is intended that the coating should serve. When a clear coating is applied in a single application, the weight of deposit may be from 0.03 to 1.0 oz. per square yard. When it is desired to apply a heavier coating in the range specified, it is generally desirable to employ several application steps with drying in between.

The coating composition may be clear or it may be provided with fillers, pigments, or dyes depending upon the particular use desired. The purpose of these additives may be to color the coating or to deluster it. Examples of the pigments include clay, titanium dioxide, calcium carbonate, blancfixe, finely divided metals such as aluminum, color lakes and tinctorial oxides.

The coating composition of the present invention may be employed to apply decorative and/or protective coatings to all sorts of substrates including paper, leather, leather substitutes, textiles, plastic films such as polyethylene, polypropylene, polyethylene terephthalate, nylon foils such as aluminum, or laminated structures comprising layers of the various materials mentioned, that is of textiles, paper, leather, plastics, and especially foamed plastic layers, and metal foils, adhered with each other and also laminar structures comprising one or more such layers, each of different composition as well as those comprising one or more layers of one such composition laminated with one or more layers of one or more different compositions.

The pigmented compositions may be employed for the mineral coating of paper for which purpose there may be employed 8 to 12 parts of plasticized cellulose acetate butyrate per hundred parts by weight of the pigment which may be clay or titanium dioxide or mixtures thereof. Pigmented compositions may be employed for the pigment dyeing of textiles or for the base-coating of porous substrates in general including textiles, leather, leather substitutes, and paper. In such systems the amount of plasticized cellulose acetate butyrate may be from 80% to 500% by weight based on the weight of the pigment in the composition.

Either the clear or pigmented compositions of the present invention may be applied for rendering textile fabrics, paper and other hydrophilic systems resistant to water while not preventing water vapor transmission. Such compositions are, therefore, useful in the production of rainwear and they are also useful for the finishing of leather and substitute leathers.

The pigmented compositions may be employed for the base-coating of leather and leather substitutes whereas the clear solutions of the present invention are quite useful as topcoatings over such pigmented base-coats or over other base-coats.

The special advantage of the compositions of the present invention is that they deposit a coating which in the dry condition has outstanding elastic recovery and flexibility and yet are tough so that they can be used as wear layers when applied to leathers or substitute leathers in garments such as shoes, jackets, and so forth. These characteristics of flexibility and outstanding elastic recovery make the coating compositions extremely valuable in the coating of thick flexible substrates, and particularly those having a thickness of 30 mils to 100 mils or higher, which are subjected to severe bending action, for example in the coating of leather or substitute leathers and particularly Corfam (registered trademark) used in shoes and other garments. The solids content of a clear lacquer film of the composition that is applied for these purposes is generally in the range of 0.03 to 0.07 oz. per square yard.

To assist those skilled in the art to practice the present invention, the following modes of operation are suggested by way of illustration, parts and percentages being by weight and the temperature in ° C. unless otherwise specifically noted.

Examples A to D are illustrative of the production of diisocyanate-extended linear polyesters.

EXAMPLE A 97.5 parts of a linear polyester, i.e. a poly(1,3-butylene adipate) obtained by a conventional process, having a molecular weight of 5,000 and a hydroxyl number of 20, is thoroughly dehydrated by sparging with nitrogen at 130 to 140° C. The polyester is then cooled to 106 to 108° C. and 4.6 parts of methylene-bis(4-phenylisocyanate) is added over a period of 15 minutes. The temperature of the reaction mixture is raised to 110 to 115° C. and mixing is continued under a positive pressure of nitrogen for 30 hours. The cooled product has a viscosity of about one million poises and is a light-colored stiff gum. A 50% solution in xylene has a Gardner Holdt viscosity of $Z_6$.

EXAMPLE B

The process of Example A is repeated except that 3.2 parts of toluene diisocyanate (2,4-isomer) is used instead of the diisocyanate mentioned in Example A. A similar stiff gum product is obtained but the color is pale yellow.

EXAMPLE C 397 parts of a linear polyester, i.e. a poly(diethylene glycol sebacate) obtained by a conventional process having a molecular weight of 2,200 and a hydroxyl number of 50 is dissolved in 400 parts of xylene and heated under a stream of nitrogen to 143° C. and refluxed, with separation of azeotroped water, for 2 hours. The mixture is cooled to 100° C. and 3.2 parts of toluene diisocyanate-(2,4-isomer) is added followed by 0.2 part of stannous octoate. After 5 hours. the solution reaches a viscosity of $Z_3$ (Gardner Holdt) at room temperature and is then cooled for further use. It contains 50 percent solid extended plasticizer.

EXAMPLE D 195 parts of a linear polyester, i.e. a poly(1,3-butylene adipate) obtained by a conventional process, having a molecular weight of 6,000 and a hydroxyl number of 18 is dissolved in 200 parts of xylene and heated to reflux under a slow stream of nitrogen for 2 hours. During that period 3 parts of water are removed by azeotropic distillation. The mixture is cooled to 100° C. and 0.4 part of stannous octoate added and mixed for 15 minutes. This is followed by the addition of 8 parts of methylenebis(4-phenyl isocyanate) over a period of ½ hour. The temperature of the reaction mixture is maintained between 100 to 105° C. for 6 hours with mixing under a positive pressure of nitrogen throughout. The material is cooled to room temperature. It has a Gardner Holdt viscosity of $Z_5$ to $Z_6$, is a pale straw color and has a solids content of 50.5 percent.

The following examples A1, B1, C1 and D1 illustrate the formation of clear plasticized cellulose acetate butyrate (CAB) solutions.

EXAMPLE A1

A solvent mixture is prepared by blending 510 parts of toluene, 170 parts of methyl ethyl ketone, and 320 parts ethyl alcohol. To 69 parts of this solvent mixture are added 15.1 parts of 3-second viscosity CAB comprising 20% butyryl and 25% acetyl content followed by 3.8 parts of a linear polyester, namely propylene glycol sebacate having a molecular weight of 8,000, and 12.1 parts of a 50 percent solution in xylene of the extended polyester of Example A. The mixture is agitated until a homogeneous solution is obtained. The mixture is pale straw colored and has a viscosity of 2,100 centipoises.

EXAMPLE B1

Similar results are obtained when Example A1 is repeated using the same amount of diisocyanate extended polyester described in Example B instead of the extended polyester of Example A, and replacing the CAB of Example A1 with 15 parts of a ½-second viscosity CAB containing 26% butyryl and 20.5% acetyl. The mixture is light colored and has a viscosity of 3,000 centipoises.

EXAMPLE C1

To 684.5 parts of the solvent mixture of Example A1 are added 24.5 parts of a linear polyester, namely propylene glycol sebacate, 131 parts of the extended polyester solution of Example C and the mixture is agitated until homogeneous. Then, with stirring continued, 160 parts of 5-second viscosity CAB comprising 30% butyryl and 18% acetyl content is added gradually and mixing continued until the CAB is dissolved. The mixture is light-colored and has a viscosity of 2,500 centipoises.

EXAMPLE D1

Example C1 is repeated using the diisocyanate-extended polyester of Example D instead of the one of Example C, and replacing the CAB with 160 parts of 3-second CAB having 26% butyryl and 20.5% acetyl content. The mixture is a pale straw color and has a viscosity of 2,800 centipoises.

(1) 20 parts of the clear finish of Example A1 is mixed with 80 parts of methyl ethyl ketone and 1 part of a red spirit-soluble dye is added. This mixture is applied by spray-coating to a piece of light brown colored leather substitute at the rate of 0.05 oz. solids per square yard of leather substitute. The finish is air dried and then embossed at 20 p.s.i. and 320° F. for 60 seconds with a sand-blasted platen. The resulting finish has a warm brown color and possesses outstanding resistance to cracking or dulling when flexed.

(2) 10 parts of the clear finish of Example B1 is mixed with 10 parts of cyclohexanone and 0.05 part of finely divided (colloidal) silica (Syloid 978) is added. This is applied to white stock paper to give a satin-like delustered finish.

(3) The clear finish of Example C1 is applied directly by doctor blade to a piece of nylon material to render a water-proof finished piece of supple feel.

(4) To 100 parts of the clear finish of Example D1 are added 0.5 part of finely divided silica (Syloid 978) and the mixture ground on a Kady mill for 30 minutes. The resulting blend is homogeneous and shows no tendency to separate. Twenty parts of the mixture is diluted with 60 parts methyl ethyl ketone and 20 parts cyclohexanone and applied by air spray to black basecoated leather substitute "Corfam." After air-drying, the finished material is embossed 30 seconds at 20 p.s.i. and 320° F. with a skiver or hair cell grain followed by another 30-second embossing under the same conditions with a sand-blasted platen. The resulting product has a satin luster and appears like fine quality finished calf-skin. It is free from white break and did not crack or turn dull when flexed.

We claim:
1. A composition capable of forming a coating having improved flexibility comprising
 (a) an inert volatile organic solvent,
 (b) a ½ to 5-second viscosity cellulose acetate butyrate containing 20 to 30% butyrate and 26 to 18% acetate, and, for each 100 parts by weight of the cellulose acetate butyrate,
 (c) from 0 to 30 parts by weight of a linear polyester of a diol having 2 to 8 carbon atoms and a dicarboxylic acid having 4 to 12 carbon atoms, said polyester having a hydroxyl number from 10 to 50, an acid number of not over 10, and a molecular weight of 4,000 to 8,000, and
 (d) from 35 to 70 parts by weight of a condensation product, having a molecular weight of at least 8,000 up to 20,000, of (1) an organic diisocyanate, and (2) a linear polyester of a diol having 2 to 8 carbon atoms and a dicarboxylic acid having 4 to 12 carbon atoms, said polyester having a hydroxyl number from

10 to 50, an acid number of not over 5, and a molecular weight of 2,000 to 7,500.

the total amount of polyester (c) and condensation product (d) being from 35 to 70 parts per 100 parts of cellulose acetate butyrate and the solvent (a) being a solvent for the cellulose acetate butyrate (b), the polyester (c) and the condensation product (d).

2. A composition as defined in claim 1 in which the organic diisocyanate is toluene-2,4-diisoycanate.

3. A composition as defined in claim 1 in which the organic diisocyanate is methylene-bis(4-phenylisocyanate).

4. A composition as defined in claim 1 in which the linear polyester (2) of (d) is a poly(1,3-butylene adipate).

5. A composition as defined in claim 1 in which the linear polyester (2) of (d) is a poly(diethylene glycol sebacate).

References Cited

UNITED STATES PATENTS

| | | | |
|---|---|---|---|
| 3,245,827 | 4/1966 | Weber | 260—13 |
| 3,277,031 | 10/1966 | Valls et al. | 260—13 |
| 3,316,189 | 4/1967 | Adams | 260—13 |
| 3,370,025 | 2/1968 | Salo et al. | 260—13 |
| 3,380,950 | 4/1968 | Blomeyer | 260—13 |

FOREIGN PATENTS

| | | | |
|---|---|---|---|
| 163,028 | 11/1952 | Australia | 260—16 |
| 500,523 | 3/1954 | Canada | 260—16 |

WILLIAM H. SHORT, Primary Examiner

E. WOODBERRY, Assistant Examiner

U.S. Cl. X.R.

117—132, 138.5, 138.8, 142, 155, 161